3,354,131
INHIBITING PRE-VULCANIZATION WITH
POLYSULFIDES
Chester D. Trivette, Jr., St. Albans, W. Va., and Aubert
Y. Coran, Creve Coeur, Mo., assignors to Monsanto
Company, St. Louis, Mo., a corporation of Delaware
No Drawing. Filed Mar. 22, 1967, Ser. No. 625,025
20 Claims. (Cl. 260—79.5)

ABSTRACT OF THE DISCLOSURE

Pre-vulcanization of rubber containing sulfur-vulcanizing agent and accelerator is inhibited by incorporating 0.01 to 2.25 parts of $RS_xR'$ where R and R' are aralkyl, aryl, alkaryl, alkyl, alicyclic, tetrahydrofurfuryl, furfuryl, or alkoxyalkyl and $x$ is 2 to 5, inclusive.

---

This application is a continuation-in-part of Ser. No. 368,385, filed May 18, 1964.

This invention relates to an improved vulcanizing process for rubber. In particular, it relates to a process for preventing the premature vulcanizing of vulcanizable rubber stocks.

Premature of incipient vulcanizing may occur during the usual processing steps prior to the final vulcanizing step or during storage between processing steps. This phenomenon, known as "scorching," is one of the rubber industry's major problems. Scorched rubber is rough and lumpy after extruding, or sheeting-out, and must be discarded. Conditions must be controlled to avoid its formation. On the other hand, it is economical to employ as high a processing temperature as is feasible in order to keep mixing cycles short and to accelerate rubber stocks so they will cure in the shortest possible time. Accordingly, the compounder must bear in mind the possibility of scorching and adjust his curing ingredients or lower his processing temperature or both at the first sign of trouble.

Mercaptobenzothiazole is a valuable organic accelerator but by present standards would be classed as "scorchy." Various derivatives thereof have been developed which, although more expensive, impart significantly greater processing safety. The thiazolesulfenamides are an important example of the delayed-action accelerators. The vulcanizing process of this invention may employ stocks containing delayed-action accelerators with further advantage in processing safety in most instances. It may also be used with the cheaper, more scorchy accelerators with a correspondingly greater degree of improvement. The development of the high pH furnace blacks has intensified the scorching problem because these blacks lack the inherent inhibiting effect of the acidic channel blacks. The improved vulcanizing process of this invention may advantageously be used to process stocks containing furnace blacks as well as stocks containing other types of black and other fillers used in the compounding of rubber articles. It is also applicable to gum stocks.

It has long been known that vulcanization can be effected with certain organic sulfur compounds, as for example, amine sulfides and phenolic sulfides. The properties of hydrocarbon sulfides free from functional substituents like that contained in the aforesaid vulcanizing agents have been investigated but with negative results. It has been reported that the addition of an alkyl or aryl tetrasulfide to rubber stocks containing thiosulfenamide accelerators failed to produce a cure after heating under the usual conditions. For example, diphenyltetrasulfide is not a vulcanizing agent, and these sulfides have been heretofore regarded as having little use in the manufacture of rubber articles. However, it has now been discovered that in the presence of a sulfur-vulcanizing agent these organic sulfides having a carbon linked to sulfur remarkably inhibit pre-vulcanization. These inhibitors may be represented by the formula

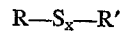
$$R-S_x-R'$$

where R and R' are alkyl, aralkyl, alkaryl, aryl, or alicyclic, and $x$ is a number, whole or fractional, within the range of about 2 to 5, inclusive. The aryl radicals, where present, are preferably members of the benzene and naphthalene series. It will be appreciated, of course, that substituents which convert these compounds to vulcanizing agents must be avoided. For instance, hydroxy groups are not permissible, but substituents inert in the vulcanizing process may be present. These include alkoxyalkyl as, for example, methoxyethyl, ethoxyethyl, methoxypropyl, ethoxypropyl, butoxyethyl, butoxypropyl, and propoxypropyl. Ether substituents may be present in the ring as in furfuryl and tetrahydrofurfuryl, but hydrocarbon radicals are preferred. Representative alicyclic radicals are cyclopentyl, cyclohexyl, and cyclooctyl. In the foregoing formula $x$ represents the total sulfur content and also the average number of sulfur atoms in the various sulfides which may be present. In some stocks the inhibiting effect becomes marginal when $x$ is 2 or 5, and in general, $x$ is preferably 3 or 4. Also, R and R' are preferably alkyl groups of 4 to 20 carbon atoms, inclusive. The alkyl sulfides are more versatile in the sense that they are less sensitive to the type of accelerator with which they are used. Although the alkyl sufides containing 1 to 3 carbon atoms in the alkyl groups are effective, the lower volatility and reduced odor of the higher members render them preferable.

Sulfides employed in the process of this invention may be prepared by methods well known in the art. For example, fusing the thiol corresponding to the desired sulfide with sulfur yields useful polysulfides accompanied by elimination of by-product hydrogen sulfide. The reaction is catalyzed by traces of amine. Disulfides result from oxidation of the mercaptans. Alternately, an active halide can be condensed with sodium polysulfide. It should be observed, however, that this halide should be mono-functional. Di-functional halides yield polymeric sulfides which are vulcanizing agents, not inhibitors of pre-vulcanization. The preparation of the sulfides forms no part of the present invention. The product resulting from the aforesaid reactions are usually mixtures, and it is nowise necessary to isolate a single pure component. However, as increasing amounts of sulfur are incorporated into the molecule, the presence of dissolved sulfur becomes more pronounced and detracts from the effectiveness.

The following examples will illustrate the invention in greater detail and the best mode for carrying it out but are not to be taken as limitative.

Stocks A and B illustrate practice of the invention with two widely different thiazole accelerators; namely, 2-mercapto benzothiazole and a delayed action sulfenamide derived therefrom. Regardless of the polysulfide selected, it inhibited pre-vulcanization of stocks containing 2-mercapto benzothiazole, but the stocks cured at a rate equal to or greater than the control stock. Even with the delayed-action accelerator, scorch time could be increased by as much as 30% with only slight increase in cure time depending upon the polysulfide used. The base stocks had the following composition:

| | Stocks, Parts by Wt. | |
|---|---|---|
| | A | B |
| Smoked sheets | 100.0 | 100.0 |
| Carbon black (HAF) | 50.0 | 50.0 |
| Zinc oxide | 5.0 | 5.0 |
| Stearic acid | 3.0 | 3.0 |
| Hydrocarbon softener | 3.0 | 3.0 |
| Sulfur | 2.0 | 1.3 |
| 2-mercaptobenzothiazole | 1.0 | |
| N-tertiary butyl-2-benzothiazolesulfenamide | | 0.7 |

Stocks A and B served as the control stocks. Other stocks were compounded by adding 1.0 part by weight of pre-vulcanization inhibitor. For all the stocks Mooney scorch times at 121° C. were determined by means of a Mooney plastometer. The time in minutes required for the Mooney reading to rise five points above the minimum was recorded. Longer times are indicative of greater processing safety. Scorch ratings were calculated by dividing the Mooney scorch time of the stock containing the pre-vulcanizing inhibitor by the Mooney scorch time of the control stock and multiplying by 100. These ratings were indicative of the percentage improvement over the control. Additionally, cure ratings were calculated from the time required to cure the stocks at 144° C. Curing characteristics were determined by means of the Monsanto Oscillating Disc Rheometer described by Decker et al. in Rubber World, December 1962. See also Chemical and Engineering News, May 13, 1963. From the Rheometer cure curves the time to reach 95% cure was noted and a rating calculated by dividing said time for the control stock by said time for the stock containing the pre-vulcanizing inhibitor. Multiplying these quotients by 100 gave ratings based on a value of 100 for the untreated control. A valve above a hundred meant that the stock actually cured faster than the untreated control. An important characteristic of the pre-vulcanizing inhibitors of this invention is that in general the rate of cure at vulcanizing temperature is not diminished but, on the contrary, is in many cases increased. The data are recorded in the table below. The pre-vulcanization inhibitors all possessed the formula $$R\!-\!S_x\!-\!R$$

but it is merely a matter of convenience that the R's are the same. Unsymmetrical sulfides may be used just as well. The values for R and x and the corresponding ratings for stocks containing these inhibitors are recorded. As noted above the value of x is simply the average value based upon the total sulfur content. It was established by vapor phase chromatography that the principal product was the sulfide which corresponded to the total sulfur, but there were significant amounts of both lower and higher sulfides present.

| R | x | Base Stock | Mooney Scorch Rating | Cure Rating |
|---|---|---|---|---|
| $CH_3$ | 3 | A | 136 | 109 |
| | | B | 110 | 75 |
| $n\text{-}C_3H_7$ | 3 | A | 168 | 114 |
| | | B | 114 | 75 |
| $i\text{-}C_4H_9$ | 2 | A | 124 | 109 |
| | | B | 107 | 94 |
| $n\text{-}C_4H_9$ | 3 | A | 163 | 114 |
| | | B | 112 | 79 |
| $sec\text{-}C_4H_9$ | 3 | A | 160 | 117 |
| | | B | 110 | 81 |
| $t\text{-}C_4H_9$ | 3 | A | 165 | 161 |
| | | B | 117 | 93 |
| $t\text{-}C_4H_9$ | 4 | A | 154 | 158 |
| | | B | 103 | 102 |
| $n\text{-}C_6H_{13}$ | 3 | A | 159 | 115 |
| | | B | 112 | 84 |
| $n\text{-}C_8H_{17}$ | 2 | A | 136 | 102 |
| | | B | 106 | 100 |
| $n\text{-}C_8H_{17}$ | 2.5 | A | 146 | 102 |
| | | B | 128 | 83 |
| $n\text{-}C_8H_{17}$ | 3 | A | 152 | 102 |
| | | B | 123 | 81 |
| $n\text{-}C_8H_{17}$ | 4 | A | 141 | 106 |
| | | B | 126 | 86 |
| $n\text{-}C_8H_{17}$ | 5 | A | 135 | 102 |
| | | B | 123 | 86 |
| $n\text{-}C_{12}H_{25}$ | 3 | A | 144 | 102 |
| | | B | 114 | 84 |
| $n\text{-}C_{12}H_{25}$ | 4 | A | 121 | 106 |
| | | B | 113 | 86 |
| $n\text{-}C_{12}H_{25}$ | 5 | A | 128 | 108 |
| | | B | 115 | 86 |
| $n\text{-}C_{14}H_{29}$ | 3 | A | 139 | 103 |
| | | B | 110 | 91 |
| $C_6H_5\text{-}$ | 2 | A | 155 | 122 |
| | | B | 114 | 98 |
| $C_6H_5\text{-}$ | 3 | A | 135 | 138 |
| | | B | 106 | 104 |
| $C_6H_5\text{-}$ | 4 | A | 124 | 133 |
| | | B | 121 | 102 |
| $C_6H_5\text{-}$ | 5 | A | 121 | 135 |
| | | B | 101 | 102 |
| $\beta\text{-}C_{10}H_7\text{-}$ | 3 | A | 127 | 145 |
| | | B | 111 | 98 |
| $o\text{-}C_7H_7$ (tolyl) | 3 | A | 149 | 133 |
| | | B | 122 | 100 |
| $m\text{-}C_7H_7$ (tolyl) | 3 | A | 154 | 130 |
| | | B | 130 | 95 |
| $p\text{-}C_7H_7$ (tolyl) | 3 | A | 167 | 125 |
| | | B | 124 | 96 |
| $p\text{-}t\text{-butyl }C_6H_4\text{-}$ | 3 | A | 162 | |
| | | B | 111 | |
| $C_6H_5\text{-}CH_2\text{-}$ | 2 | A | 122 | 111 |
| | | B | 103 | 94 |
| $C_6H_5\text{-}CH_2\text{-}$ | 3 | A | 128 | 113 |
| | | B | 111 | 97 |
| 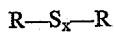 | 2 | A | 106 | 109 |
| | | B | 100 | 102 |
| $C_6H_5\text{-}CH_2\text{-}CH_2\text{-}$ | 3 | A | 127 | 127 |
| | | B | 112 | 110 |
| $C_6H_5\text{-}CH_2\text{-}CH_2\text{-}$ | 4 | A | 121 | 122 |
| | | B | 106 | 97 |
| $C_6H_{11}$ (cyclohexyl) | 3 | A | 157 | 111 |
| | | B | 114 | 92 |

Employing Stock A, various amounts of di(n-octyl)-trisulfide were added thereto. Mooney scorch times at 121° C. indicated increased processing safety with as little as 0.01 part by weight of pre-vulcanization inhibitor and increasingly greater effect with amounts up to 20 parts by weight although the modulus and tensile properties were poorer with as much as 10 parts by weight. The stocks were cured by heating in a press at 144° C. The results follow:

| Amount of Di(n-octyl)-trisulfide, Parts by wt. | Mooney Scorch Time at 121° C., Minutes | Modulus of Elasticity at 300% Elongation, Lbs./in.$^2$ | Tensile Strength at Break, Lbs./in.$^2$ | Ultimate Elongation, Percent |
|---|---|---|---|---|
| None | 12.2 | 2,040 | 3,300 | 430 |
| 0.01 | 13.0 | 2,110 | 3,500 | 440 |
| 0.10 | 13.8 | 1,980 | 3,300 | 430 |
| 0.25 | 15.4 | 1,940 | 3,300 | 440 |
| 0.50 | 15.4 | 1,950 | 3,300 | 440 |
| 1.00 | 18.7 | 1,890 | 3,400 | 470 |
| 10.00 | 29.1 | 1,050 | 1,900 | 430 |
| 20.00 | 37.6 | 580 | 1,200 | 470 |

Employing Stock B, various amounts of di(n-octyl) polysulfide were added thereto. The pre-vulcanization inhibitor, n-octyl $S_x$-n-octyl, was prepared by reacting 2 moles of octanethiol with 1.5 gram moles of sulfur. One mole of $H_2S$ was lost as by-product so that the average value of $x$ was 2.5. Significant improvement in processing safety was observed with 0.06 part by weight of the pre-vulcanization inhibitor; and, again, increasing amounts gave correspondingly greater effect, the preferred range being 0.25–0.5 part per hundred in this system.

| Pre-Vulcanization Inhibitor, Parts by wt. | Mooney Scorch Time at 121° C., Minutes | Modulus of Elasticity at 300% Elongation, Lbs./in.$^2$ | Tensile Strength at Break, Lbs./in.$^2$ | Ultimate Elongation, Percent |
|---|---|---|---|---|
| None | 31.1 | 2,280 | 4,200 | 480 |
| 0.06 | 32.6 | 2,250 | 4,000 | 470 |
| 0.12 | 32.8 | 2,240 | 4,000 | 480 |
| 0.25 | 33.3 | 2,300 | 4,200 | 500 |
| 0.50 | 34.0 | 2,250 | 4,300 | 510 |
| 2.0 | 35.3 | 2,000 | 4,000 | 530 |

In the loaded natural rubber stocks described above, the acelerators were further varied and inhibition of pre-vulcanization uniformly noted as illustrated by Stocks C–J. Base Stocks C and D, containing widely used commercial accelerators, had the composition:

| | Stocks, Parts by Weight | |
|---|---|---|
| | C | D |
| Smoked sheets | 100 | 100 |
| Carbon black (HAF) | 50 | 50 |
| Zinc oxide | 5 | 5 |
| Stearic acid | 3 | 3 |
| Hydrocarbon softener | 3 | 3 |
| Sulfur | 2.5 | 2.5 |
| 2,2'-dithio bis(benzothiazole) | 1.0 | |
| Morpholino-2-thiobenzothiazole | | 0.7 |

Scorch times at 121° C. were determined with a Mooney plastometer, and the time required to reach 95% of cure ($t_{95\%}$) at 144° C. were determined with the Monsanto Rheometer and recorded:

| Pre-Vulcanization Inhibitor | Amount | Base Stock | Mooney Scorch Time at 121° C. in minutes | $t_{95\%}$ Rheometer at 144° C. |
|---|---|---|---|---|
| None | | C | 16.8 | 41 |
| Dicyclohexyl trisulfide | 1.36 | C | 20.8 | 36 |
| Didodecyl trisulfide | 2.24 | C | 23.5 | 42 |
| Diisobutyl trisulfide | 1.00 | C | 21.5 | 41 |
| None | | D | 40.3 | 32 |
| Dicyclohexyl trisulfide | 1.36 | D | 48.7 | 32 |
| Didodecyl trisulfide | 2.25 | D | 49.7 | 33 |
| Diisobutyl trisulfide | 1.00 | D | 57.1 | 35 |

It will be noted that in each instance the addition of the sulfide increased the processing safety without increasing the time of cure.

The practice of the invention with still other delayed-action thiazolesulfenamide accelerators and with other types of accelerators is illustrated by Stocks E–J, which had the following composition:

| | Stocks, Parts by Weight | | | | |
|---|---|---|---|---|---|
| | E | F | G | H | J |
| Smoked sheets | 100 | 100 | 100 | 100 | 100 |
| Carbon black (HAF) | 50 | 50 | 50 | 50 | 50 |
| Zinc oxide | 5 | 5 | 5 | 5 | 5 |
| Stearic acid | 3 | 3 | 3 | 3 | 3 |
| Hydrocarbon softener | 3 | 3 | 3 | 3 | 3 |
| Diphenyl guanidine | 1 | | | | |
| Butylaldehyde aniline | | 1 | | | |
| Diethylthiocarbamyl-2-thiobenzothiazole | | | 0.7 | | |
| N,N-dicyclohexyl-2-benzothiazole sulfenamide | | | | 0.5 | |
| N,N-diethyl-2-benzothiazole sulfenamide | | | | | 0.5 |

The inhibitor added to the base stock was di(n-octyl) trisulfide. Mooney scorch times at 121° C. were determined. The stocks were vulcanized in a press at 144° C. and the modulus and tensile properties determined with the results recorded below:

| Base Stock | Amount of Inhibitor | Mooney Scorch Time at 121° C., Minutes | Modulus of Elasticity at 300% Elongation, Lbs./in.$^2$ | Tensile Strength at Break, Lbs./in.$^2$ | Ultimate Elongation, Percent |
|---|---|---|---|---|---|
| E | None | 16.0 | 2,200 | 3,700 | 470 |
| E | 0.5 | 29.5 | 2,050 | 3,900 | 500 |
| F | None | 21.7 | 1,690 | 2,000 | 430 |
| F | 0.5 | 38.6 | 1,620 | 2,600 | 450 |
| G | None | 22.1 | 3,130 | 3,600 | 370 |
| G | 1.0 | 31.2 | 2,870 | 3,600 | 390 |
| H | None | 41.0 | 2,230 | 3,400 | 430 |
| H | 1.0 | 51.8 | 2,120 | 3,400 | 460 |
| J | None | 33.4 | 2,700 | 3,800 | 400 |
| J | 1.0 | 39.6 | 2,550 | 3,800 | 420 |

Although dithiocarbamate and thiuram sulfide accelerator are not preferred in the practice of this invention, it will be noted that excellent results were obtained with a thiazole accelerator containing a thiocarbamyl substituent.

As illustrative of practice of the invention with gum stocks, vulcanizable compositions were compounded comprising:

| | Stocks, Parts by Weight | | |
|---|---|---|---|
| | K | L | M |
| Smoked sheets | 100.0 | 100.0 | 100.0 |
| Zinc oxide | 5.0 | 5.0 | 5.0 |
| Stearic Acid | 2.0 | 2.0 | 2.0 |
| Sulfur | 2.5 | 2.5 | 2.5 |
| 2-mercapto benzothiazole | 1.0 | | |
| 2,2'-dithio bis(benzothiazole) | | 1.0 | |
| Morpholino-2-thiobenzothiazole | | | 0.7 |

As a pre-vulcanization inhibitor 1.0 part by weight of di(isopropyl) trisulfide was added and the Mooney scorch times determined at 121° C.

Mooney scorch time at 121° C. minutes
Stock K _____ 17.6
Stock K+pre-vulcanization inhibitor _____ 25.7
Stock L _____ 51.7
Stock L+pre-vulcanization inhibitor _____ 61.3
Stock M _____ 85.5
Stock M+pre-vulcanization inhibitor _____ 95.5

Although the magnitude of the effect on the vulcanization characteristics varies with the rubber, pre-vulcanization of synthetic rubber is inhibited by the process of this invention. As illustrative of the effect in styrene-butadiene copolymer rubber, rubber stocks were compounded comprising:

| | Stocks, Parts by Weight | | | |
|---|---|---|---|---|
| | N | O | P | Q |
| Styrene-butadiene copolymer rubber (SBR15W) | 100.00 | 100.00 | 100.00 | 100.00 |
| Carbon black (HAF) | 50.00 | 50.00 | 50.00 | 50.00 |
| Zinc oxide | 4.00 | 4.00 | 4.00 | 4.00 |
| Hydrocarbon softener | 10.00 | 10.00 | 10.00 | 10.00 |
| Stearic acid | 2.00 | 2.00 | 2.00 | 2.00 |
| Sulfur | 1.75 | 1.75 | 1.75 | 1.75 |
| N-tertiary butyl-2-benzothiazolesulfenamide | 1.00 | | | |
| Morpholino-2-thiobenzothiazole | | 1.00 | | |
| 2,2'-dithio bis(benzothiazole) | | | 1.00 | |
| Di(o-tolyl)guanidine | | | 0.50 | |
| N-cyclohexyl-2-benzothiazole-sulfenamide | | | | 1.00 |

Pre-vulcanization inhibitor was added to the stocks as indicated below and Mooney scorch times determined at 135° C. Again, the time recorded was the time required to reach 5 points above the minimum reading. Comparison to the commercial inhibitor N-nitrosodiphenylamine demonstrated greater effectiveness in the stock accelerated with N-tertiary butyl-2-benzothiazolesulfenamide and comparable effectiveness in the stock accelerated with morpholino-2-thiobenzothiazole.

| Stock | Pre-Vulcanization Inhibitor | Amount | Mooney Scorch Time at 135° C., Minutes |
|---|---|---|---|
| N | None | | 20.1 |
| N | Di(n-octyl)trisulfide | 1.0 | 21.8 |
| N | N-nitrosodiphenylamine | 1.0 | 20.8 |
| O | None | | 27.8 |
| O | Di(n-octyl)trisulfide | 0.5 | 28.4 |
| O | N-nitrosodiphenylamine | 0.5 | 28.4 |
| P | None | | 11.4 |
| P | Di(n-octyl)trisulfide | 1.0 | 13.3 |
| Q | None | | 18.9 |
| Q | Di(n-octyl)trisulfide | 1.0 | 19.9 |

Inhibition of pre-vulcanization was also observed in polybutadiene rubber and in oil-extended styrene-butadiene rubber blended with polybutadiene rubber. The polybutadiene rubber used in Stock R was manufactured by the Phillips Petroleum Company, and that used in Stock S was manufactured by Firestone Tire and Rubber Company. In Stock R, ISAF black was used and in Stock S, IHAF black was used.

| | Stocks, Parts by Weight | |
|---|---|---|
| | R | S |
| Oil-extended styrene-butadiene rubber (SBR712) | 69.00 | |
| Polybutadiene rubber | 50.00 | 100.00 |
| Carbon black | 65.00 | 50.00 |
| Hydrocarbon softener | 20.00 | 10.00 |
| Zinc oxide | 3.00 | 3.00 |
| Stearic acid | 2.00 | 2.00 |
| Sulfur | 2.00 | 1.75 |
| N-tert. butyl-2-benzothiazole sulfenamide | 1.00 | 0.85 |
| N-isopropyl N'-phenyl-p-phenylenediamine | 1.50 | |

Mooney scorch times of the base stocks and of the same stocks to which had been added 1.0 part by weight of di(n-octyl)trisulfide were determined. The following results were observed:

Mooney scorch time at 121° C. minutes
Stock R _____ 50.0
Stock R+pre-vulcanization inhibitor _____ 53.8
Stock S _____ 35.6
Stock S+pre-vulcanization inhibitor _____ 38.1

In butyl rubber, a copolymer which contains only a small proportion of a conjugated diene, the pre-vulcanization of conventional curing systems based on accelerated sulfur cures can be inhibited. As illustrative of the effects achieved, stocks were compounded comprising:

| | Stocks, Parts by Weight | |
|---|---|---|
| | T | U |
| Butyl rubber | 100 | 100 |
| Carbon black (ISAF) | 40 | 40 |
| Hydrocarbon processing aid | 10 | 10 |
| Stearic acid | 1 | 1 |
| Zinc oxide | 5 | 5 |
| Sulfur | 2 | 2 |
| 2,2'-dithiobis(benzothiazole) | 1 | 1 |
| Tellurium diethyldithiocarbamate | 1.62 | |
| Bismuth dimethyldithiocarbamate | | 1.62 |

To these stocks 1.0 part by weight of pre-vulcanization inhibitor was added and Mooney scorch times determined at 121° C.

| Stock | Pre-Vulcanization Inhibitor | Mooney Scorch Time at 121° C., Minutes |
|---|---|---|
| T | None | 14.1 |
| T | Di(n-octyl)trisulfide | 15.6 |
| U | None | 49.2 |
| U | Di(o-tolyl)trisulfide | 58.0 |

Although the improvements are less, copolymer rubber prepared from non-conjugated dienes can be used in the practice of the invention. The ethylene-propylene terpolymer rubber used in Stock V was Nordel, a trademark of E. I. du Pont de Nemours and Company, and is reported to contain a small proportion of a non-conjugated diene. The vulcanizable composition was as follows:

Stock V, parts by weight
Ethylene-propylene terpolymer rubber _____ 100
Carbon black (SAF) _____ 50
Zinc oxide _____ 5
Sulfur _____ 0.75
2-mercaptobenzothiazole _____ 2.00
Tetramethyl thiuram disulfide _____ 0.75

There was added 1.0 part by weight of pre-vulcanization inhibitor and Mooney scorch time was determined at 135° C.

Mooney scorch time
Pre-vulcanization inhibitor: at 135° C. minutes
   None _____ 6.2
   Di(n-octyl)trisulfide _____ 6.6
   Di(o-tolyl)trisulfide _____ 6.8

In general, practice of this invention is intended with any of the rubbers containing sufficient unsaturation to render them vulcanizable with sulfur. Such rubbers contain residual olefinically-unsaturated linkages which render them vulcanizable with sulfur. Although the unsaturation may be small, any of the sulfur-vulcanizable rubbers may be used in the practice of this invention. As noted, these include butyl rubber which is a synthetic rubber produced by the co-polymerization of isobutylene and a small percentage of butadiene or other diene such as isoprene. It contains at least 85% isobutylene and not more than 15% diene. A typical commercial product, GR 117, is a copolymer of 97.5% isobutylene and 2.5% isoprene. Suitable elastomers of higher functionality include polyisoprene, polybutadiene, butadiene-acrylonitrile copolymer rubber, 2 methyl butadiene-1,3 polymer, butadiene-methyl methacrylate copolymer, and the like.

A wide variety of accelerated sulfur-vulcanizing systems respond favorably to the addition of the new prevulcanization inhibitors. These include formaldehyde-aniline, acetaldehyde-ethylidene aniline described in U.S. Patent No. 1,659,151, anhydro-formaldehyde aniline, butylaldehyde aniline described in U.S. Patent 1,467,984, heptaldehyde aniline, diphenyl guanidine, di(o-tolyl)guanidine, N - phenyl N' - o-tolylguanidine, di(o-ethylphenyl)guanidine, o-tolylbiguanide, triphenylguanidine, 2-mercaptothiazoline, 2-mercapto-4-methylthiazole, 2,6-dimethylmorpholino-2-thiobenzothiazole, N'N'-diisopropyl-2-benzothiazolesulfenamide, N-isopropyl-2-benzothiazolesulfenamide, N-tert. octyl-2-benzothiazolesulfenamide.

By sulfur vulcanizing systems are meant systems which depend either directly or indirectly upon elemental sulfur or selenium for vulcanization. Elemental sulfur may be used in any of its several modifications and grades like rhombic sulfur, monoclinic sulfur, S mu (insoluble in carbon disulfide) flowers of sulfur, or rubber-makers sulfur. Sulfur vulcanizing agents will be understood to include compounds of sulfur having the property of vulcanizing rubber; as, for example, aliphatic polysulfide vulcanizing agents, polymeric sulfur terminated by organic radicals, amine polysulfide vulcanizing agents, and phenol polysulfide vulcanizing agents. A commercial aliphatic polysulfide vulcanizing agent (VA-7) is manufactured by the Thiokol Chemical Corporation. Another commercial vulcanizing agent (ZM 399) manufactured by the same company is identified as an organic polysulfide. Different vulcanizing agents with and without inhibitor were evaluated in base stocks comprising:

| | Stocks, Parts by Weight | |
|---|---|---|
| | W | X |
| Smoked sheets | 100.00 | 100.00 |
| Carbon black (ISAF) | 60.00 | 60.00 |
| Zinc oxide | 5.00 | 5.00 |
| Stearic acid | 2.50 | 2.50 |
| Hydrocarbon softener | 20.00 | 20.00 |
| Morpholino-2-thiobenzothiazole | 0.35 | |
| 2-mercaptobenzothiazole | | 0.60 |
| Vulcanizing agent | 3.00 | 3.00 |

As pre-vulcanization inhibitor there was added 1.0 part by weight of di-(n-octyl)trisulfide. The Mooney scorch times in minutes at 121° C. are recorded below:

| Vulcanizing Agent | Base | Scorch Times in Minutes | |
|---|---|---|---|
| | | No Inhibitor | Inhibitor Present |
| Sulfur (rubbermakers) | W | 42.8 | 61.4 |
| Commercial aliphatic polysulfide | W | 50.2 | 55.0 |
| Commercial organic polysulfide | W | 43.3 | 54.5 |
| N,N'-dithiobis(morpholine) | X | 70.0 | 76.5 |
| Sulfur (insoluble) | W | 41.0 | 57.1 |

The increased processing safety in the presence of amine sulfide is especially significant because these vulcanizing agents are used when it is desired to increase processing safety. Further improvement is obtained by the new adjuvants. In the compounding of vulcanizable stocks containing the pre-vulcanization inhibitor of this invention it is preferable to employ saturated hydrocarbon softener derived from mineral oils. Pine tar has an adverse effect on processing safety as is well known in the art.

For reasons of economy branched-chain alkyl polysulfides are advantageous in the practice of the invention. As illustrative of such products, propylene trimer and propylene tetramer were converted to thiols by boron-trifluoride-catalyzed addition of hydrogen sulfide according to the process described by R. C. Butler, U.S. Patent 2,928,880, Mar. 15, 1960. The low-boiling material was stripped leaving a mixture containing 80–85% thiol and 15–20% high-boiling material, mostly sulfides. These products were then converted to polysulfides by amine-catalyzed reaction with sulfur. The propylene polymers yield tertiary alkyl sulfides. A sample of commercial secondary alkyl thiol mixture in which the size of alkyl groups was in the range of $C_9-C_{11}$ was converted to polysulfide in similar manner. The products were evaluated in a base stock comprising

| | Stock Y, Parts by weight |
|---|---|
| Smoked sheets | 100 |
| Carbon black (ISAF) | 60 |
| Zinc oxide | 5 |
| Stearic acid | 2.5 |
| Hydrocarbon softener | 20 |
| Antioxidant | 2.5 |
| Sulfur | 3.0 |
| N-tert. Butyl-2-benzothiazolesulfenamide | 0.35 |

Other stocks were compounded by adding 0.5 part by weight of pre-vulcanization inhibitor prepared as described above. Mooney scorch times at 121° C. were determined, the results of which are recorded below. In the table "(ter)" designates the products prepared from propylene polymer.

| Pre-Vulcanization Inhibitor Alkyl $S_x$—Alkyl | | Mooney Scorch Time, Minutes |
|---|---|---|
| Alkyl | $x$ | |
| $C_{9-11}$ (sec) | 3.5 | 33.8 |
| $C_9$ (ter) | 3.5 | 36.1 |
| $C_{12}$ (ter) | 3.5 | 33.2 |
| $C_9$ (ter) | 4.0 | 34.9 |
| $C_{12}$ (ter) | 4.0 | 34.1 |
| Control-no inhibitor | | 30.4 |

It is apparent from the examples given that many different rubbers may be used and many different accelerators and polysulfides in varying amounts may be utilized in the processing of vulcanizable compositions according to this invention. It is impossible to attempt a comprehensive catalogue of useful components and their useful range. The processing safety needed and that afforded by the polysulfides vary. To formulate compositions having increased processing safety in the light of the present disclosure will call for technical knowledge; but from his knowledge of materials available and their properties, a compounder can deduce their applicability to the practice of the invention. Routine tests not of an inventive character will provide reliable data. It is possible to select combinations of accelerator and polysulfide pre-vulcanization inhibitor which lead to no practical improvement in processing safety. It is assumed that no one will wish to carry out a useless process or will be misled because it is possible to misapply the teachings of the present disclosures in order to do so.

It will be apparent from the foregoing examples that amounts of pre-vulcanization inhibitor within the range of about 0.01 to about 2.25 parts by weight constitute a useful range of amounts and that amounts up to about 0.50 part do not significantly affect the modulus and tensile properties of the vulcanizates. The range of 0.25 to 0.5 part is a preferred range. However, acceptable modulus and tensile properties are obtained with amounts up to at least about 2.25 parts by weight. Also, sulfides to illustrate the effect of concentration and which contained from 2.5 to 3 sulfur atoms per mole are merely illustrative of sulfides to which the concentrations are applicable. Said concentrations are applicable to disulfides and other members of the general class herein disclosed. For example, a base recipe was compounded comprising:

| | Parts by weight |
|---|---|
| Smoked sheets | 100 |
| Carbon black (HAF) | 50 |
| Zinc oxide | 5 |
| Stearic acid | 3 |
| Hydrocarbon softener | 3 |
| Sulfur | 2 |
| Morpholino-2-thiobenzothiazole | 0.6 |

Amounts of disulfide pre-vulcanization inhibitor indicated in the table following were added to the base recipe and scorch times at 144° C. determined with a Monsanto Oscillating Disc Rheometer. The scorch time was taken as the time in minutes for a rise of two Rheometer units above the minimum reading.

| Amount of Pre-Vulcanization Inhibitor | Scorch Time at 144° C. Where Inhibitor Is— | | |
|---|---|---|---|
| | Di-n-octyl disulfide | Diphenyl disulfide | Dibenzyl disulfide |
| None | 10.6 | 11.3 | 12.2 |
| 0.01 | 11.0 | 12.1 | 12.7 |
| 0.10 | 10.7 | 12.2 | 12.7 |
| 0.25 | 11.2 | 12.7 | 12.9 |
| 0.50 | 11.5 | 12.7 | 12.5 |
| 1.00 | 11.8 | 13.3 | 13.3 |
| 2.00 | 12.4 | 14.2 | 13.0 |
| 2.25 | 13.0 | 13.8 | 13.7 |

It is intended to cover all changes and modifications of the examples of the invention herein chosen for purposes of disclosure which do not constitute departures from the spirit and scope of the invention.

What is claimed is:

1. Method of inhibiting pre-vulcanization of sulfur-vulcanizable rubber containing sulfur vulcanizing agent in vulcanizing amount and organic accelerator in accelerating amount which comprises incorporating therein, in minor amount effective to inhibit pre-vulcanization within the range of 0.01 to 2.25 parts per 100 parts of rubber, inhibitor of the formula $$R-S_x-R'$$

where R and R' are organic radicals containing 1-20 carbon atoms, inclusive, selected from a group consisting of aralkyl, aryl, alkaryl, alkyl, alicyclic, tetrahydrofurfuryl, furfuryl, and alkoxyalkyl, and $x$ is 2 to 5, inclusive.

2. The method of claim 1 wherein the accelerator is selected from the group consisting of thiazole accelerators, aryl guanidine accelerators, and aldehyde amine accelerators.

3. The method of claim 1 wherein the vulcanizing agent is elemental sulfur, the accelerator is a thiazole accelerator, R and R' are alkyl of 4–20 carbon atoms, inclusive, and $x$ is greater than 2 but less than 5.

4. The method of claim 1 wherein the vulcanizing agent is elemental sulfur, the accelerator is a thiazole accelerator, R and R' are lower-alkylphenyl, and $x$ is greater than 2 but less than 5.

5. The method of claim 1 wherein the vulcanizing agent is elemental sulfur, the accelerator is a benzothiazole accelerator, R and R' are alkyl of 4–20 carbon atoms, inclusive, and $x$ is greater than 2 but less than 5.

6. The method of claim 1 wherein the vulcanizing agent is elemental sulfur, the accelerator is 2-mercaptobenzothiazole, R and R' are alkyl of 4–20 carbon atoms, inclusive, and $x$ is greater than 2 but less than 5.

7. The method of claim 1 wherein the vulcanizing agent is elemental sulfur, the accelerator is 2,2'-dithiobis(benzothiazole), R and R' are alkyl of 4–20 carbon atoms, inclusive, and $x$ is greater than 2 but less than 5.

8. The method of claim 1 wherein the vulcanizing agent is elemental sulfur, the accelerator is a thiazole accelerator, R and R' are octyl, and $n$ is about 3.

9. The method of claim 1 wherein the vulcanizing agent is elemental sulfur, the accelerator is a thiazole accelerator, R and R' are tolyl, and $n$ is about 3.

10. The method of claim 1 wherein the vulcanizing agent is elemental sulfur, the accelerator is a thiazole accelerator, R and R' are tertiary alkyl of 9–12 carbon atoms, inclusive, and $x$ is at least about 3 but not more than about 4.

11. Sulfur-vulcanizable rubber having incorporated therein sulfur-vulcanizing agent in vulcanizing amount, organic accelerator in accelerating amount, and pre-vulcanization inhibitor in minor amount effective to inhibit pre-vulcanization within the range of 0.01 to 2.25 parts per 100 parts of rubber of the formula $$R-S_x-R'$$

where R and R' are organic radicals containing 1–20 carbon atoms, inclusive, selected from a group consisting of aralkyl, aryl, alkaryl, alkyl, alicyclic, tetrahydrofurfuryl, furfuryl, and alkoxyalkyl, and $x$ is 2 to 5, inclusive.

12. Sulfur-vulcanizable rubber of claim 11 wherein the accelerator is selected from the group consisting of thiazole accelerators, aryl guanidine accelerators, and aldehyde amine accelerators.

13. Sulfur-vulcanizable rubber of claim 12 wherein the rubber is natural rubber.

14. Sulfur-vulcanizable rubber of claim 12 wherein the rubber is styrene-butadiene copolymer rubber.

15. Sulfur-vulcanizable rubber of claim 11 wherein the accelerator is a thiazole accelerator, R and R' are alkyl of 4–20 carbon atoms, inclusive, and $x$ is greater than 2 but less than 5.

16. Sulfur-vulcanizable rubber of claim 11 wherein the accelerator is a thiazole accelerator, R and R' are lower-alkylphenyl, and $x$ is greater than 2 but less than 5.

17. Sulfur-vulcanizable rubber of claim 11 wherein the vulcanizing agent is elemental sulfur, the accelerator is a thiazole sulfenamide, R and R' are alkyl of 4–20 carbon atoms, inclusive, and $x$ is greater than 2 but less than 5.

18. Sulfur-vulcanizable rubber of claim 11 wherein the vulcanizing agent is elemental sulfur, the accelerator is 2-mercaptobenzothiazole, R and R' are alkyl of 4–20 carbon atoms, inclusive, and $x$ is greater than 2 but less than 5.

19. Sulfur-vulcanizable rubber of claim 11 wherein the vulcanizing agent is elemental sulfur, the accelerator is 2,2'-dithiobis(benzothiazole), R and R' are alkyl of 4–20 carbon atoms, inclusive, and $x$ is greater than 2 but less than 5.

20. Sulfur-vulcanizable rubber of claim 11 wherein the accelerator is a thiazole accelerator, R and R' are tertiary alkyl of 9–12 carbon atoms, inclusive, and $x$ is at least about 3 but not more than about 4.

No references cited.

JOSEPH L. SCHOFER, Primary Examiner.

D. DENENBERG, Assistant Examiner.